(12) United States Patent
Simms et al.

(10) Patent No.: US 6,322,618 B1
(45) Date of Patent: Nov. 27, 2001

(54) ADJUSTABLE DUCT ASSEMBLY FOR FUME AND DUST REMOVAL AND FILTER CLEANER

(75) Inventors: Maury Simms; Robin Boudreault, both of Montreal; Marco Finauri, Lasalle, all of (CA)

(73) Assignee: Texas Electroniques Canada Inc., Montreal (CA)

( * ) Notice: Subject to any disclaimer, the term of this patent is extended or adjusted under 35 U.S.C. 154(b) by 0 days.

(21) Appl. No.: 09/420,426

(22) Filed: Oct. 19, 1999

Related U.S. Application Data
(60) Provisional application No. 60/104,730, filed on Oct. 19, 1998.

(51) Int. Cl.[7] .................................................. B01D 46/04
(52) U.S. Cl. ............................... 96/428; 55/294; 55/302; 55/490; 55/283; 95/26; 95/279
(58) Field of Search ........................... 55/283, 294, 302, 55/385.1, 385.2, 490; 95/26, 279, 280, 425, 428; 454/63, 65

(56) References Cited

U.S. PATENT DOCUMENTS

| | | | |
|---|---|---|---|
| 807,480 | * 12/1905 | Mathis | 454/65 |
| 3,147,098 | * 9/1964 | Honan et al. | 55/294 |
| 3,303,635 | * 2/1967 | Sherrill | 55/294 |
| 3,339,348 | * 9/1967 | Bratton | 55/294 |
| 3,555,785 | * 1/1971 | Wooldridge et al. | 55/294 |
| 4,240,809 | * 12/1980 | Elsbernd et al. | 55/294 |
| 4,860,644 | 8/1989 | Kohl et al. . | |
| 5,281,246 | * 1/1994 | Ray et al. | 55/302 |
| 5,322,535 | 6/1994 | Simms et al. . | |
| 5,336,130 | 8/1994 | Ray . | |
| 5,482,505 | 1/1996 | Hedlund . | |
| 5,527,217 | 6/1996 | Engström . | |
| 5,536,206 | * 7/1996 | Bodmer et al. | 454/65 |

FOREIGN PATENT DOCUMENTS
973012    8/1975   (CA) .

* cited by examiner

Primary Examiner—Duane Smith
Assistant Examiner—Jason M. Greene
(74) Attorney, Agent, or Firm—Adrian Zahl (57) ABSTRACT

An adjustable duct assembly for the collection of fumes, dust and the like comprises two duct sections connected end to end by a duct support system comprising two elongate arms pivotally connected, the arms attached to the adjacent ends of the ducts, externally. A counterbalance arm extends from the duct support of a lower or outer duct section beyond the pivot point of the elongate arms, to counterbalance the lower or outer arms. A filter arrangement may be associated with the duct assembly, consisting of a generally planar filter element within a housing. A travelling nozzle arrangement directs a stream of air in a direction countervailing the normal flow through the filter, for backwash cleaning of the filter. First and second drives propel the nozzle simultaneously across and along the filter, to provide full backwash cleaning coverage of the filter.

9 Claims, 6 Drawing Sheets

ADJUSTABLE DUCT ASSEMBLY FOR FUME AND DUST REMOVAL AND FILTER CLEANER

This application claims benefit of U.S. Provisional Application No. 60/104,730 filed Oct. 19, 1998.

FIELD OF INVENTION

This invention relates to the collection and removal of fumes, dust and similar material, and particularly, to a removal apparatus which is controllably movable. The invention further relates to a filter assembly with a backwash cleaning modality.

BACKGROUND OF THE INVENTION

The collection and removal of unwanted material, such as noxious fumes, dust and the like, can be obtained by the use of ducting having a collecting valve capable of being positioned adjacent to a source of unwanted material, the ducting connected to an abstraction system. Some of the uses of such removal devices include welding operations, grinding machines, laboratory operations which can produce fumes from chemical reactions, and surgical operations. Such devices typically comprise a duct assembly having a collecting mouth or inlet at one end, and a connection to an abstraction fan at the other. The assembly has some flexibility so that the collecting mouth or inlet can be stationed at any desired position. The assembly usually needs to be periodically repositioned and some form of support arrangement is required to retain the assembly in any given orientation and to permit easy movement and repositioning. Once repositioned the assembly should retain the new orientation and not be subject to undesirable movement. The mouth or inlet is normally movable in any direction in a plane and also movable in and out of such plane.

Various arrangements exist providing an adjustable assembly, including the provision of internal or external jointed frames which support the duct. Various devices such as lifting or position-balancing means, such as springs and other devices can be used, together with frictional means at joints.

Canadian Patent number 973,012 (Nederman) discloses a folding duct assembly having an internal duct support extending substantially the length of the duct. The duct support comprises a jointed arm having spring counterbalances to counter the weight of the duct. The joints of the duct support incorporate friction pads to retain the duct in a desired position. Jointed duct support structures are also shown in U.S. Pat. No. 5,527,217 (Engstrom) and U.S. Pat. No. 4,860,644 (Kohl et al). In the Kohl et al device, the joints incorporate friction pads to restrict their mobility, while the joints in Engstrom are linked to a retainer wire that in turn is held in place by a friction fit.

It is desirable, and in most cases essential, that there is provided means for holding the duct assembly in position during use, while still permitting easy movement to a new position. These conflicting requirements are difficult to satisfy with friction type joints. Wear at the joints will interfere with acceptable operation and regular adjustment will be required. If the support structure or frame is housed within the ducts of the assembly, such adjustment becomes very difficult. Also, the action of the friction joints can be adversely affected by the material being extracted through the ducts.

In a further aspect, the typical dust or contaminant removal apparatus includes a filter arrangement, whereby the contaminated air is purified before discharge from the apparatus. A typical filter comprises a hollow cylindrical structure having a folded paper filter element. This type of filter is characterized by inconsistent spacing between the filter pleats, resulting in difficulty in removing dust and dirt lodged within the filter. This reduces the life-span and efficiency of the filter. Accordingly, the use of a planar filter element is desirable. Further, it is desirable to provide a means whereby the filter may be automatically cleaned, without removal of the filter from the apparatus. A typical filter-cleaning arrangement is disclosed within U.S. Pat. No. 5,322,535 (Simms), relating to an apparatus for cleaning a hollow cylindrical air filter. The arrangement comprises a travelling nozzle, which both rotates and travels axially relative to the filter, thereby backwashing the filter with a narrowly directed stream of air moving in a countervailing direction to the normal direction of flow. This arrangement is limited for use with a hollow cylindrical filter, and is not capable of use with a planar filter arrangement. In general, it is desirable to provide a moving nozzle arrangement for directing a narrow air stream against the filter for backwash cleaning, rather than an air stream which covers the entire filter simultaneously, as a more efficient backwash cleaning means.

SUMMARY OF THE INVENTION

The present invention provides a ducting assembly for collection and removal of material, comprising an assembly comprising a plurality of duct sections and a duct support. A first duct has a collection inlet at an inlet end, an outlet end connected to an inlet end of a second duct. The outlet end of the first duct is connected to the inlet end of the second duct by the duct support. The duct support comprises at least two elongate arms, pivotally connected, a first arm attached to the first duct at the outlet end and the second arm attached to the second duct at the inlet end. Extending from the first arm beyond the pivot connection is a counterbalance arm weighted such as to counterbalance the first duct and any associated inlet device, such as a hood or the like. The adjacent ends of the ducts are connected in an air-tight manner by flexible ducting. The outlet end of the second duct is movably mounted by duct support means, which again can comprise two pivotally connected elongate arms. Counterbalancing of the duct assembly can be by an air piston or air spring assembly.

In a further aspect, the invention comprises a filter assembly having filter cleaning means. The assembly comprises a filter housing, at least one generally planar filter element, and a cleaning means for directing a gas flow against the filter element for backwash cleaning. In order to provide complete or substantially complete coverage of the filter, while still permitting a relatively forceful air blast, the cleaning means comprises a nozzle, linked to a compressed gas supply, directed at the filter. The nozzle is mounted for movement relative to the filter, along two axes within a plane parallel to the filter. First and second drive means propel the nozzle along the two axes.

Preferably, the filter is vertical, and the nozzle includes drive means to move the nozzle along vertical and horizontal axes, whereby the nozzle describes a generally zig-zag pattern as it shuttles simultaneously or sequentially along the horizontal and vertical axes. The drive means may alternatively move the nozzle in a spiral pattern. The nozzle maintains a constant distance from the filter throughout.

Preferably, dual spaced-apart parallel filter elements are provided, with the cleaning means comprising dual oppositely-facing nozzles mounted to a traveller. The traveller shuttles on a horizontal support, with the support in turn being mounted to and travelling vertically on one or more pillars. Drive means propel the traveller and horizontal support respectively, in reciprocating movement.

A controller controls the reciprocating movement of the traveller and permits an operator to activate the cleaning means on a periodic basis.

DETAILED DESCRIPTION OF THE PREFERRED EMBODIMENTS

Figure 1:
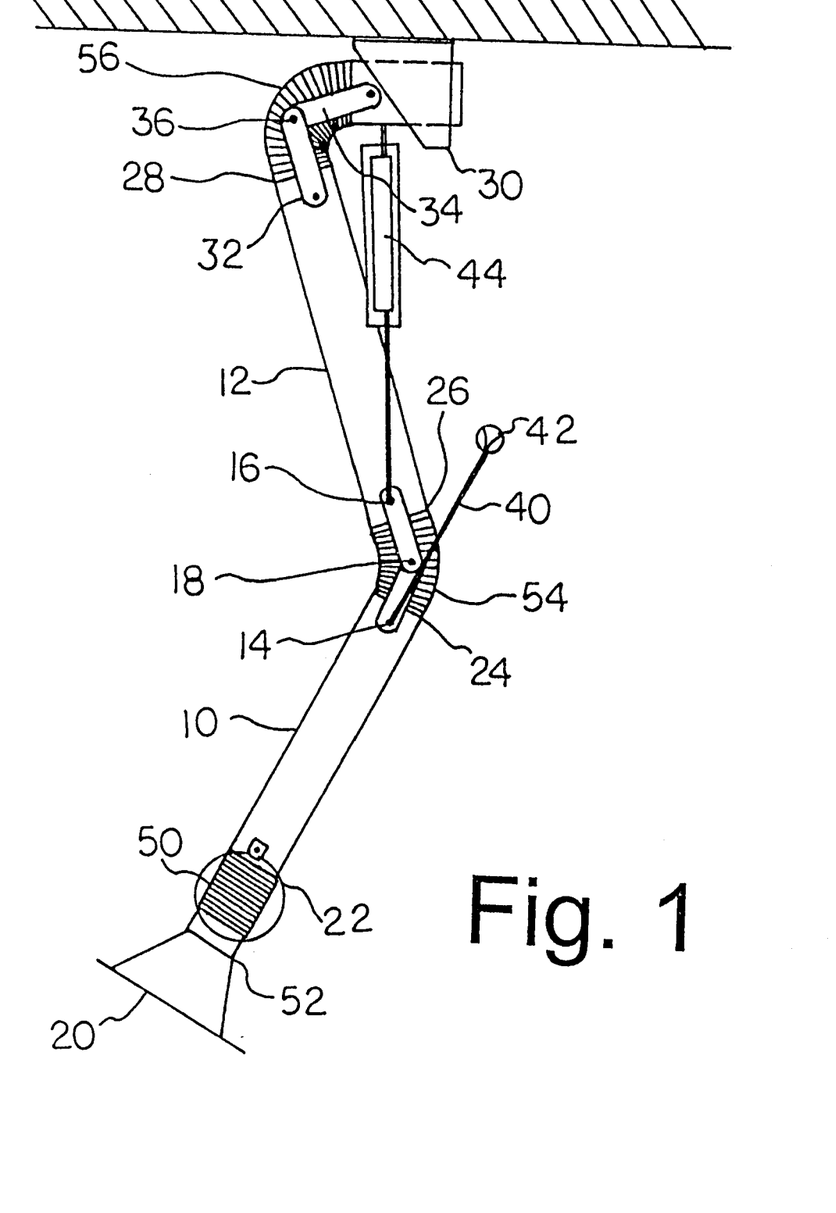
FIG. 1 is a side elevation of one embodiment of the present invention.
Figure 2:
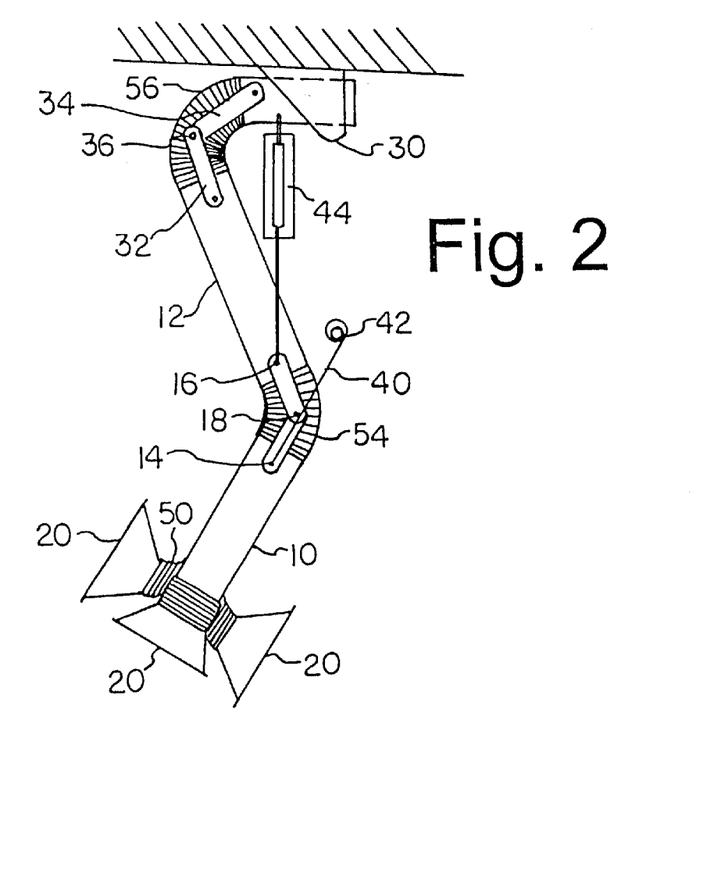
FIG. 2 is a view in the same direction as FIG. 1, showing the movement of a collecting hood.
Figure 3:
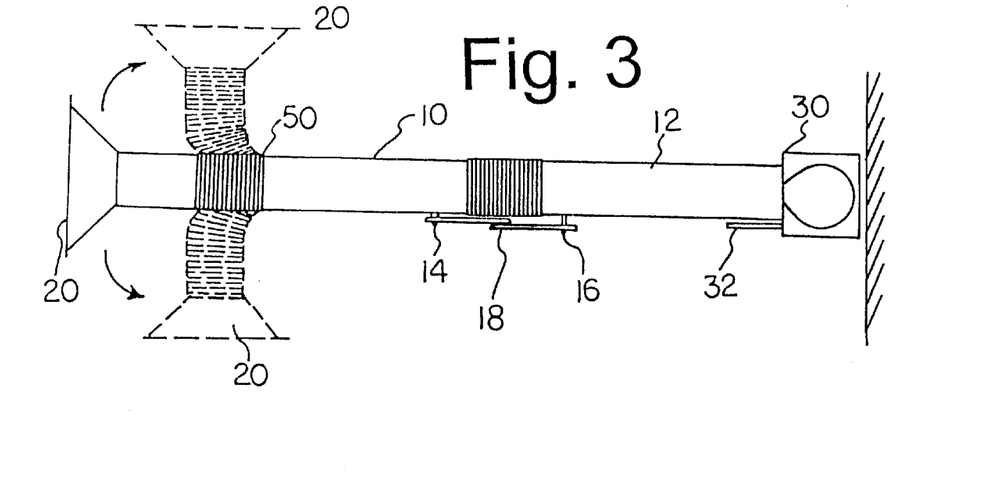
FIG. 3 is a view normal to that of FIG. 1, showing the collecting hood movement.

The adjustable duct assembly illustrated in FIGS. 1 to 3 includes two duct sections comprising a first duct section 10 and a second duct section 12 in end-to-end relationship, and also includes a duct support comprising two elongate arms 14 and 16, pivotally connected by a pivot joint at 18.

The first duct section 10 has a collection inlet 20 attached to its inlet end 22 and is attached to arm 14 at the outlet end 24. The second duct section 12 is attached at its inlet end 26 to arm 16 and at its outlet end 28 is attached to a mounting support 30, in this example by a second pair of elongate arms 32 and 34 pivotally connected at 36.

Rigidly attached to the arm 14 is an arm 40 which extends from the arm 14 beyond the pivot joint 18. At the outer end of the arm 40 is a weight 42. Extending between the arm 16 and the support 30 is a gas spring 44, of known form. The gas spring 44 acts to hold the duct section 12 in any desired orientation but can be overridden to move the duct section. The weight 42 counterbalances the weight of the first duct section 10 and its associated parts, maintaining the duct section in a desired orientation but allowing easy movement of the duct section to any position. The weight 42 can be a localized weight mounted on the arm 40, or the arm 40 can act as the weight as an entirety.

The suction inlet 20, in the example in the form of a hood, is connected to the inlet end via flexible duct sections 50 extending from a tubular section 52 on the hood to the inlet end 22. Similarly the outlet end 24 of the duct section 10 is connected to the inlet end 26 of duct section 12 by a flexible duct section 54 and a further flexible duct section 56 connects the outlet end of the duct section 12 to the support 30. The suction inlet hood 20 can be swivelled around to any desired direction, as seen in FIGS. 2 and 3. Also, if desired, the mounting support 30 can be pivotally mounted to permit swivelling of the entire assembly.

The invention permits the positioning of a collection inlet in any desired position, being freely and easily moved but at the same time, being held firmly in any set position. No friction joints exist, with thus freedom from wear and other problems. No spring counterweights are used with the associated problems of their ineffectiveness. The support structures, the arms 14 and 16, arms 32 and 34, the counterweights 40 and 42 and gas spring 44 are all external of the duct sections and therefore do not interfere with the air flow.

The collected air and other material can be exhausted to the atmosphere, through a filter system for example, or can be filtered and treated, with the air recycled.

The above description and the drawings relate to a particular development which is capable of modification. For example, it is possible to insert a third duct section between the second duct section 12 and the support mounting 30, with a pivotal connection between them as is between duct sections 10 and 12, and with a further counterbalance weight as at 40 and 42.

Figure 4:
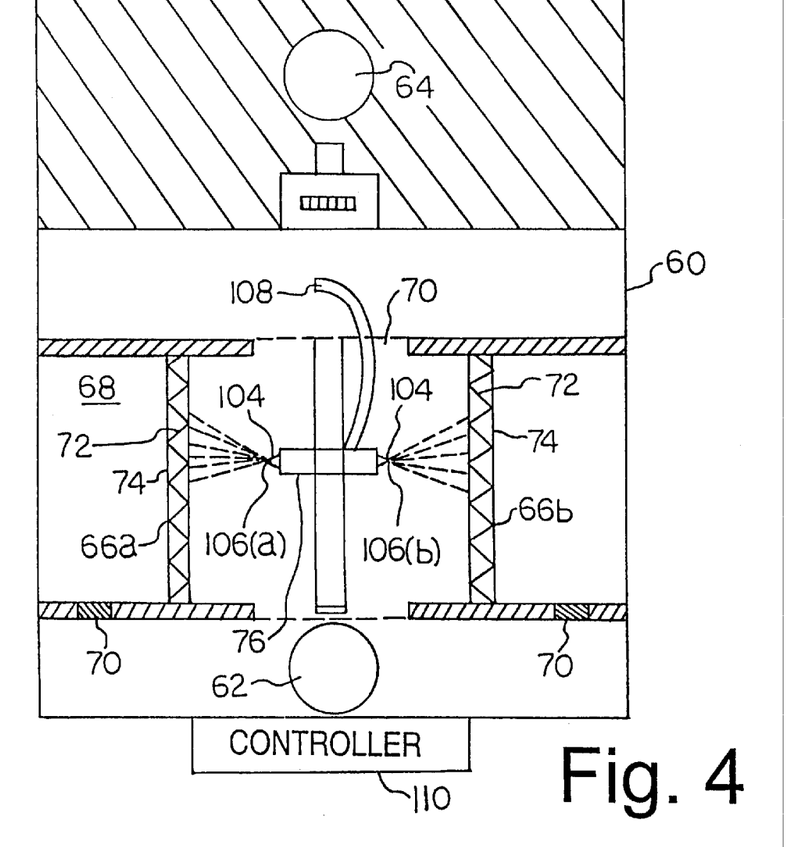
FIG. 4 is a side elevation of a filter sub-unit.
Figure 5:
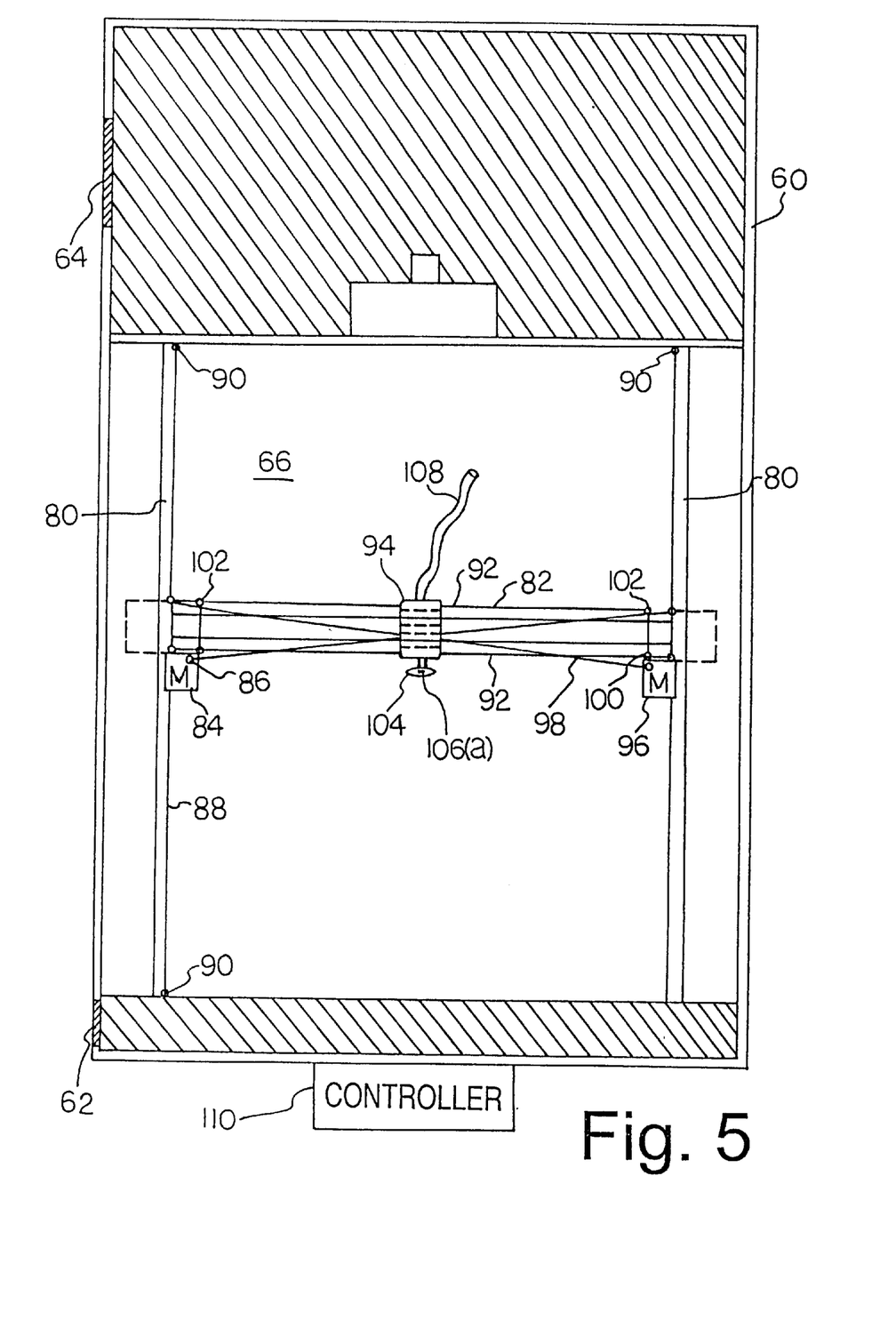
FIG. 5 is a second side elevation of the filter sub-unit.

Referring to FIGS. 4 and 5, the filter portion of the apparatus comprises a housing 60, having an opening 62 extending therethrough and communicating with the free end of the second duct section 12. The housing features a second opening 64, for discharge of cleaned exhaust gases. Within the housing, first and second spaced-apart planar filter elements 66a and 66b are retained in parallel relationship within an internal compartment 68. The internal compartment includes apertures 70 whereby the air flow passing through the housing is directed inwardly through the filters towards an interior space between the filters, and this purified air is subsequently vented out of the compartment and filter housing. The filter elements may comprise any convenient substantially planar filters, and conveniently comprise a folded paper filter element 72, retained within framework 74. The filters are disposed in a generally vertical orientation. It will be understood that the apparatus may be positioned in any orientation, and it is simply for convenience of description that a vertical orientation of the filters is selected.

Disposed within the interior space between the filter elements is a filter cleaning means 76, as shown in detail within FIG. 5.

The filter cleaning means comprises a pair of spaced-apart, vertically disposed, elongate pillars 80, each comprising a round bar. An air nozzle support 82 spans the pillars, and is slidably engaged thereto for vertical travel along substantially the length of the vertical bars. A first electric motor 84 is mounted to the air nozzle support and drives the air nozzle support in a vertical direction along the pillars 80. The air nozzle support 82 comprises a pair of spaced-apart parallel bars 92. An air nozzle traveller 94 is slidably engaged to the air nozzle support 82, and is mounted for reciprocating horizontal movement along the air nozzle support. A second electric motor 96 mounted to the air nozzle support 82 propels the air nozzle traveller 94 along the air nozzle support 82, by means of a belt 98 connected to the traveller and driven by the second motor 99. The second motor is associated with a drive pulley 100 linked to the second belt 98, with the opposed end of the belt threaded through guide bearings 102. The first and second motors are geared to propel the traveller horizontally at a relatively high speed, and vertically at a relatively low speed.

The air nozzle support 82 is driven vertically relative to the vertical supports by means of a pulley 86 and belt 88 arrangement. In this arrangement, the belt 88 is journalled by an array of guide bearings 90, with the pulley 86 being rotatably driven by the motor 84.

An air nozzle 104 is mounted to the air nozzle traveller 94. The nozzle features two opposed openings 106a and 106b for directing an air stream at the first and second filter elements 66a and 66b respectively. Air is supplied to the nozzle by means of an air hose 108 linked to a supply of compressed air.

The reciprocal horizontal shuttling of the nozzle, when combined with the relatively slow vertical movement thereof, results in a generally zig-zag pattern being described by the nozzle, relative to the filter elements.

A control means 110 controls operation of the filter cleaning means 76, whereby the air nozzle traveller 94 travels in a reciprocating horizontal movement as the traveller 94 is simultaneously being driven in a reciprocating vertical direction, thereby providing fill coverage to backwash all portions of both of the filter elements.

Figure 6:
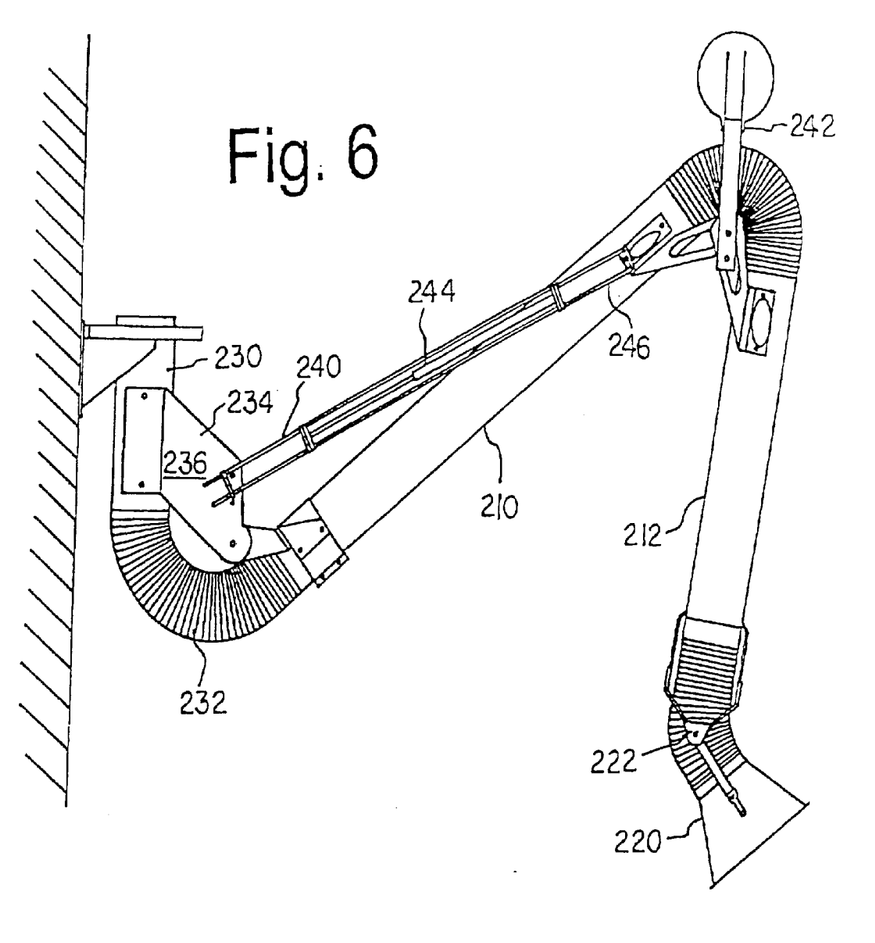
FIG. 6 is a side elevation of another embodiment of the duct assembly.
Figure 7:
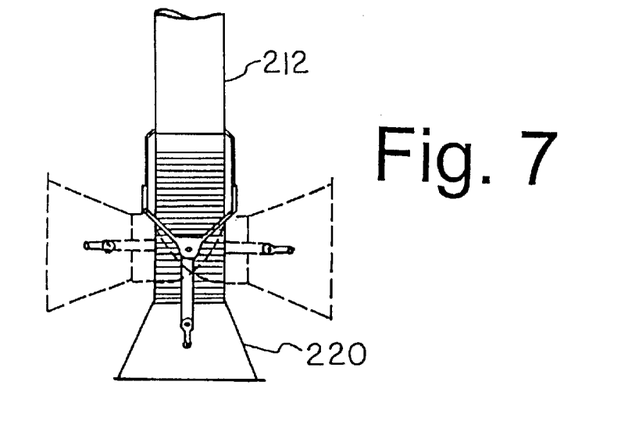
FIG. 7 shows a portion of the duct assembly of FIG. 6, showing the pivotal movement of the inlet.

FIGS. 6 and 7 illustrate a further embodiment of the duct assembly portion of the invention. In this version, the assembly is composed of first and second duct sections 210 and 212 as in the first embodiment. A collection inlet 220 forms the inlet end of the second duct section. As shown in FIG. 7, collection inlet 220 may be pivoted about an axis, within a range of approximately 180°.

In this embodiment, a third duct section 230 is provided at the outlet end of the duct assembly, and joined to the first duct section 210 by flexible duct connection means 232. Also joining sections 230 and 210 is a hinged connection means 234, which forms a pivotal hinge means between the two sections. Connection means 234 includes a plate like member 236, fixedly mounted to third duct section 230.

A gas spring 244, and associated mount and support means 246 joins the first and third duct sections, one end of the mount means 246 being fastened to the plate like member 236.

A counterweight 242 is engaged to the second duct section 212 in much the same manner as in the first embodiment.

Figure 8:
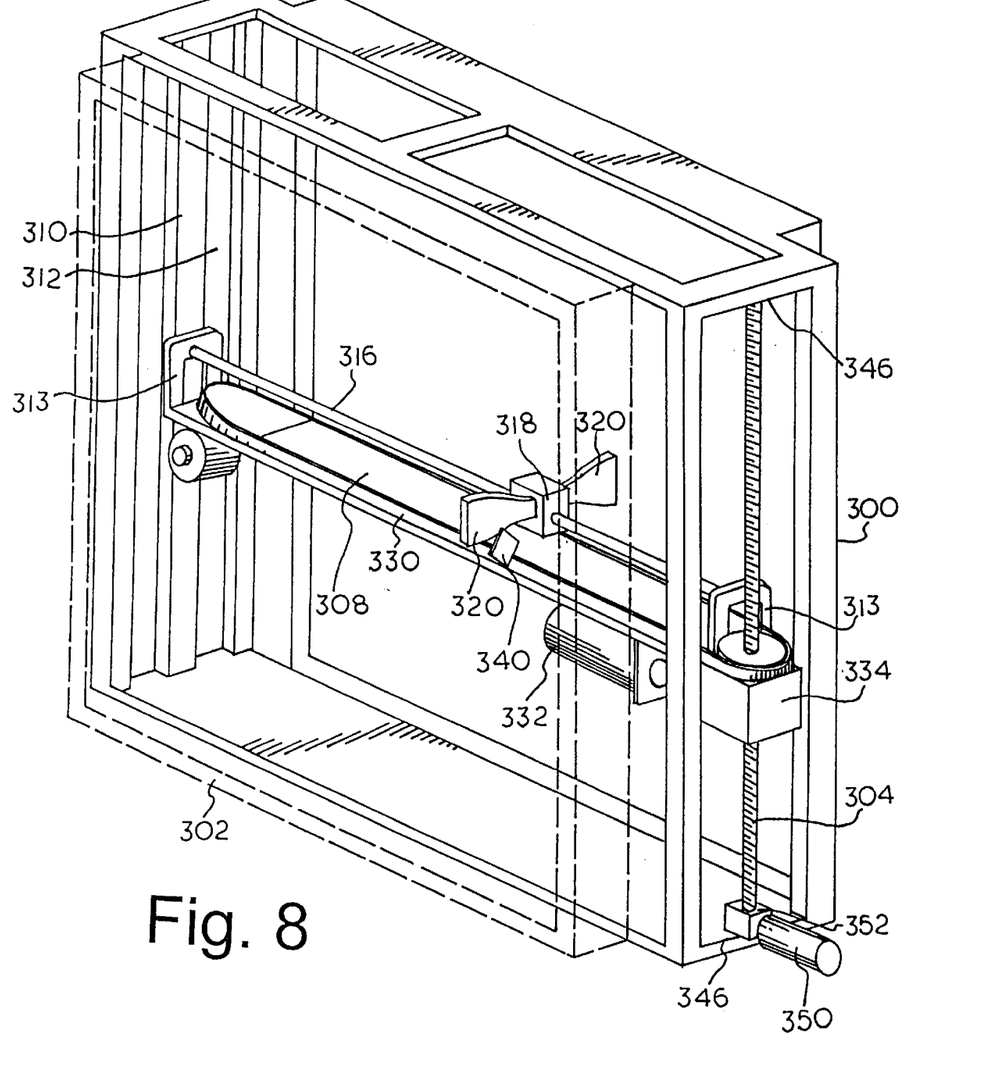
FIG. 8 is a perspective view of another embodiment of the filter sub-unit, showing a portion of the assembly.

Turning to FIG. 8, an alternative arrangement of the filter portion is shown. FIG. 8 illustrates the frame assembly 300, which is supported within a housing, not shown, in much the same manner as in the first embodiment. Filter elements 302 are shown in outline form, and are mounted to opposing sides of the frame assembly 300. A threaded pillar 304 extends the full height of the frame 300, and supports one side of beam 308. Beam 308 is moveable vertically within the assembly 300. The second end of beam 308 abuts a column 310 within the assembly 300. A coiled spring-biased tape assembly 312 suspends the beam 308 and permits vertical travel of the beam within the assembly. The wound-up portion of the tape supports the beam 308. A tongue 313 extends upwardly from each end of the beam 308. The respective tongues support an elongate rod 316 which extends parallel to the elongate axis of the beam, directly above the midline of the beam. Rod 316 slidably supports a traveller 318, which is free to move lengthwise along the beam 318, on rod 316.

A pair of paddle-shaped nozzle members 320 extend outwardly from either side of the traveller 318, and are directed towards the inside faces of the filter elements 302. The nozzle members 320 are connected to a supply of pressurized gas, not shown, for directing a narrow stream of pressurized gas at the filter elements for backwash cleaning thereof.

A continuous cord loop 330 extends around the peripheral edge of the beam 308, and is recessed into a groove within the beam 308. The cord loop 330 is driven by a motor 332, which is connected via a gear box 334 to the cord loop 330. An upwardly extending fin 340 is fastened to the cord loop, for contacting an engaging one or the other of the nozzle member 320. Upon engagement with a first nozzle member 320, the fin moves the traveller 318 in a first direction, as the cord loop means is driven by the motor 332. Upon reaching the end of the beam, the fin 340 reverses direction as the loop passes around the end of the beam, and the fin then contacts a second of the nozzle members 320, thereby moving the traveller in the reverse direction towards the opposed end of beam 308. In this fashion, traveller 318 and associated nozzle members 320 are shuttled in a reciprocal fashion along beam 308.

Beam 308 is moved vertically within the frame assembly 300, by means of a gearing arrangement within gear box 334 which engages the threaded post 304. By this means, motor 332 drives both the traveller 318 in a reciprocating horizontal direction, and beam 308 in a vertical direction. Gear box 334 includes direction reversal means whereby when beam 308 reaches either the top or bottom of the frame assembly 300, the rotational direction of the gearing within gear box 334 is reversed, in order to reverse the vertical direction of travel of beam 308.

In an alternative arrangement, which is also shown in FIG. 8, post 304 is rotatable, and is journalled within rotary mounts 346 within frame assembly 300. A motor 350, associated with gear box 352, rotatably drives the post 304. In this version, beam 308 is provided with a threaded aperture which engages post 304, for raising or lowering beam 308 as post 304 is rotated. A similar direction reversing means is provided within gear box 352, in order to reverse the direction of rotation of post 304 when resistance is encountered upon the post contacting the bottom or top of frame assembly 300.

It will be seen that in connection with both the first and second embodiments of the filter assembly, the assemblies have been illustrated and described in an orientation wherein the filter members are arranged essentially vertically. However, the assembly may be adapted for positioning in essentially any orientation, for example with the filter assemblies being on horizontal planes. All directional references are thus used only for convenience of description, and are not intended to limit the scope of the invention.

It will be further seen that in a further variant, a single filter element may be provided, with the filter compartment and nozzle arrangement being adapted accordingly.

We claim:
1. A filter assembly including backwash filter cleaning means, said assembly comprising:
   a filter housing for supporting within said housing at least one generally planar filter element having a base and top, within said housing;
   a pillar within said housing for extending from said filter base to said top;
   a nozzle support slidably engaged to said pillar and extending generally perpendicular to said pillar for reciprocal movement along said pillar at a relatively slow speed;
   first drive means for propelling said support along said pillar;
   a traveller moveably mounted to said support for relatively rapid reciprocal continuous shuttling along said support;
   second drive means for propelling said traveller along said support; and
   an air nozzle mounted to said traveller for delivering a stream of pressurized air to said filter element for the backwash cleaning thereof.

2. A filter assembly as defined in claim 1, wherein said second drive means comprises a continuous cord loop driven by a motor, and pulley means on either side of said nozzle support to maintain tension in said cord, said traveller being driven by said cord.

3. A filter assembly as defined in claim 1, wherein said post comprises a rotatably driven threaded member, said nozzle support including a mating internally threaded member whereby movement of said nozzle support is effected by rotation of said threaded member, said assembly further including drive means to rotatably drive said threaded member.

4. A filter assembly as defined in claim 1, drive means mounted to said moveable member wherein said first drive means is mounted to said nozzle support.

5. A filter assembly as defined in claim 4, wherein said first drive means also comprises said second drive means and is engaged to a continuous cord loop means for moving said traveler in a reciprocating pattern along said nozzle support.

6. A filter assembly as defined in claim 2, further including a fin extending from said cord means for continuous looping movement along at least one side of said nozzle support, said traveller including a pair of fin contact members on opposed sides thereof, wherein said traveller is driven by contact with said fin on alternating of said contact members, said traveller being driven in a continuous reciprocating movement along said nozzle support by continuous contact with said fin during travel of said fin along said at least one side of said nozzle support.

7. A filter assembly as defined in claim 1 wherein said housing includes means for retaining a second planar filter element in a position parallel to and spaced apart from said first filter element, said air nozzle support being positioned between said first and second filter elements, said nozzle comprising a first nozzle outlet directed towards said first filter element, and a second opposed nozzle outlet directed towards said second filter element for the simultaneous backwash cleaning of said first and second filter elements.

8. A filter assembly as defined in claim 1, wherein said post is helically threaded, said nozzle support including an internally threaded member for mating with said post, rotatably driven by said first drive means for propelling said support along said pillar.

9. A filter assembly as defined in claim 8, further comprising essentially a single motor for driving both of said internally threaded member and said traveller.

* * * * *